(12) United States Patent
Yoshida et al.

(10) Patent No.: US 9,519,259 B2
(45) Date of Patent: Dec. 13, 2016

(54) HOUSING STRUCTURE, OPTICAL SCANNING DEVICE, AND IMAGE FORMING APPARATUS

(71) Applicants: Daisuke Yoshida, Kanagawa (JP); Takeshi Yamakawa, Kanagawa (JP)

(72) Inventors: Daisuke Yoshida, Kanagawa (JP); Takeshi Yamakawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/016,142

(22) Filed: Feb. 4, 2016

(65) Prior Publication Data
US 2016/0231690 A1 Aug. 11, 2016

(30) Foreign Application Priority Data
Feb. 10, 2015 (JP) .................................. 2015-023939

(51) Int. Cl.
*G03G 21/00* (2006.01)
*H04N 1/00* (2006.01)
*G03G 21/16* (2006.01)
*G03G 15/04* (2006.01)

(52) U.S. Cl.
CPC ...... *G03G 21/1619* (2013.01); *G03G 21/1666* (2013.01); *H04N 1/00519* (2013.01); *H04N 1/00551* (2013.01); *H04N 1/00557* (2013.01); *G03G 15/04036* (2013.01); *G03G 2221/1636* (2013.01)

(58) Field of Classification Search
CPC .................. G03G 21/1666; G03G 2221/1636; G02B 7/025; H04K 1/00519; H04K 1/00551; H04K 1/00557

USPC .................................. 399/118; 347/247, 263
See application file for complete search history.

(56) References Cited

U.S. PATENT DOCUMENTS

| | | | |
|---|---|---|---|
| 6,243,128 B1 | 6/2001 | Yamakawa | |
| 8,310,739 B2 | 11/2012 | Murakami et al. | |
| 8,330,786 B2 | 12/2012 | Watanabe et al. | |
| 8,841,690 B1 * | 9/2014 | Kim ...................... | H01L 33/483 257/100 |
| 2005/0012974 A1 | 1/2005 | Ono et al. | |
| 2006/0066061 A1 | 3/2006 | Hosokawa | |
| 2007/0139745 A1 | 6/2007 | Shoji et al. | |
| 2007/0165099 A1 | 7/2007 | Yoshizawa et al. | |

(Continued)

FOREIGN PATENT DOCUMENTS

| | | |
|---|---|---|
| JP | 11-352437 | 12/1999 |
| JP | 2000098287 A * | 4/2000 |

(Continued)

*Primary Examiner* — Robert Beatty
(74) *Attorney, Agent, or Firm* — Duft Bornsen & Fettig LLP

(57) ABSTRACT

A housing structure includes: a housing configured to house therein components for use by an image forming apparatus and having an opening; a cover member configured to cover the opening of the housing and including an adherend portion; and a sealing member placed between an opening end of the housing and the cover member and configured to seal between the cover member and the housing by being compressed when the cover member is attached to the housing, the sealing member adhering to the adherend portion of the cover member, and at least one groove being formed in the adherent portion of the cover member.

13 Claims, 7 Drawing Sheets

(56) References Cited

U.S. PATENT DOCUMENTS

| | | |
|---|---|---|
| 2007/0252077 A1 | 11/2007 | Shoji et al. |
| 2009/0185846 A1 | 7/2009 | Okamoto |
| 2009/0226213 A1 | 9/2009 | Mogi |
| 2010/0033787 A1 | 2/2010 | Serizawa et al. |
| 2011/0199663 A1 | 8/2011 | Johno et al. |
| 2011/0199664 A1 | 8/2011 | Serizawa et al. |
| 2011/0310455 A1 | 12/2011 | Serizawa et al. |
| 2011/0316958 A1 | 12/2011 | Johno et al. |
| 2013/0002789 A1* | 1/2013 | Katayama .............. G02B 26/12 347/224 |
| 2013/0135419 A1 | 5/2013 | Otoguro |
| 2016/0139533 A1* | 5/2016 | Nakatsu .............. G03G 15/043 399/216 |
| 2016/0147193 A1* | 5/2016 | Yoshida ............. H04N 1/00559 399/107 |

FOREIGN PATENT DOCUMENTS

| | | |
|---|---|---|
| JP | 2001-100134 | 4/2001 |
| JP | 2001100134 | 4/2001 |
| JP | 2009-173365 | 8/2009 |
| JP | 2009-179441 | 8/2009 |
| JP | 2010066431 | 3/2010 |
| JP | 2013-007778 | 1/2013 |
| JP | 2014-012368 | 1/2014 |

\* cited by examiner

HOUSING STRUCTURE, OPTICAL SCANNING DEVICE, AND IMAGE FORMING APPARATUS

CROSS-REFERENCE TO RELATED APPLICATIONS

The present application claims priority to and incorporates by reference the entire contents of Japanese Patent Application No. 2015-023939 filed in Japan on Feb. 10, 2015.

BACKGROUND OF THE INVENTION

1. Field of the Invention

The present invention relates generally to housing structures, optical scanning devices, and image forming apparatuses.

2. Description of the Related Art

A typical electrophotographic image forming apparatus forms an image as follows. An optical scanning device optically forms an electrostatic latent image in accordance with image data on an image bearer, such as a photoconductor, uniformly charged in advance. The electrostatic latent image is developed into a visible image with toner by a developing device. The visible image is transferred directly or via an intermediate member, such as an intermediate transfer belt, onto a recording medium such as transfer paper. A fixing device fixes the not-yet-fixed toner image on the recording medium with, for example, a pressure and/or heat. Quality and image quality of the optical scanning device are being enhanced by multi-channeled light-emitting points by adopting a laser diode array (hereinafter, "LDA"), a vertical-cavity surface-emitting laser (hereinafter, "VCSEL"), or the like.

It is already known that fouling of an optical element and the like of such an optical scanning device of an image forming apparatus with dust, a foreign material, or the like can result in an anomalous image (with a white spot or the like).

A configuration for avoiding such a problem by placing a foam material serving as a sealing member in between an optical housing and a cover member covering an opening of the optical housing in a manner to compress the foam material, thereby preventing entry of a foreign material and the like is known. An example of this configuration is disclosed in Japanese Laid-open Patent Application No. 2014-12368.

However, an optical scanning device of an image forming apparatus described in Japanese Laid-open Patent Application No. 2014-12368 is disadvantageous in that because the optical housing compresses the sealing member or an elastic member, deformation of the optical housing occurs, whereby optical characteristics can be degraded. Furthermore, the optical scanning device is disadvantageous in that because it is necessary to impart a complicated shape to the sealing member or the elastic member or divide the sealing member or the elastic member into a plurality of pieces, a sheet material yield undesirably decreases, which leads to an increase in cost.

Therefore, there is a need for a simple housing structure capable of reliably sealing a housing.

SUMMARY OF THE INVENTION

It is an object of the present invention to at least partially solve the problems in the conventional technology.

According to exemplary embodiments of the present invention, there is provided a housing structure comprising: a housing configured to house therein components for use by an image forming apparatus and having an opening; a cover member configured to cover the opening of the housing and including an adherend portion; and a sealing member placed between an opening end of the housing and the cover member and configured to seal between the cover member and the housing by being compressed when the cover member is attached to the housing, the sealing member adhering to the adherend portion of the cover member, and at least one groove being formed in the adherent portion of the cover member.

Exemplary embodiments of the present invention also provide an optical scanning device comprising: a light source configured to emit a light beam; a deflector configured to deflect the light beam emitted from the light source, thereby causing the light beam to scan in the main-scanning direction; and a housing configured to house therein a plurality of optical elements for causing the light beam deflected by the deflector to impinge on a to-be-scanned surface, the housing having the above-mentioned housing structure.

Exemplary embodiments of the present invention also provide an image forming apparatus comprising the above-mentioned housing structure and the above-mentioned optical scanning device.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
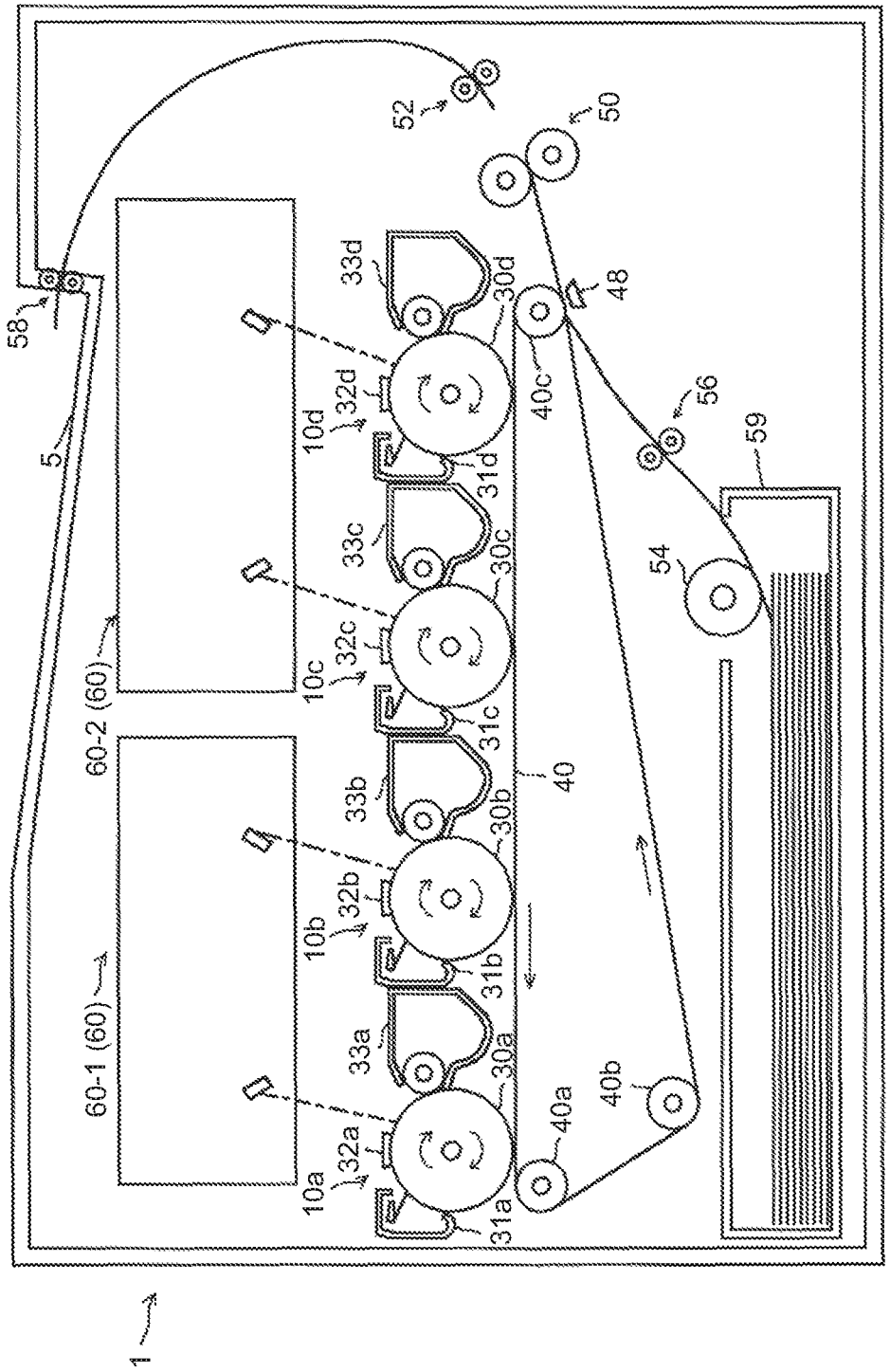
FIG. 1 is a configuration diagram schematically illustrating an image forming apparatus according to an embodiment of the present invention.

Exemplary embodiments of the present invention are described below with reference to the accompanying drawings. In each of the drawings, with reference to which the embodiments of the present invention are described, elements, such as members and components, identical in function or shape are denoted by like reference numerals so long as they are distinguishable, and repeated description is omitted.

A configuration of an image forming apparatus 1, to which a housing structure according to an embodiment is applicable, is described below with reference to FIG. 1. FIG. 1 is a schematic configuration diagram illustrating a full-color printer as an example of the image forming apparatus.

The image forming apparatus 1 illustrated in FIG. 1 includes an electrophotographic image forming unit. The image forming unit includes four image forming means denoted by 10a, 10b, 10c, and 10d. The first to fourth image forming means 10a, 10b, 10c, and 10d are identical in configuration except for the color of toner to be used. The image forming means 10a, 10b, 10c, and 10d may respectively form a magenta toner image, a yellow toner image, a black toner image, and a cyan toner image, for example. Because the image forming means are identical in configuration except for the color of developing agent (toner), in the description given below, the reference letter a, b, c, or d appended to identify each color is omitted as appropriate.

A drum-shaped photoconductor 30, which is an image bearer, is arranged in the image forming means 10. A charging member 32, a developing device 33, and a cleaning device 31 are arranged around the photoconductor 30. The photoconductor 30 is configured to be driven to rotate clockwise. The photoconductor 30 is configured such that when a predetermined bias voltage is applied to the charging member 32, the surface of the photoconductor 30 being rotated is uniformly charged. Although a non-contact-type charging member utilizing corona discharge or the like is employed as the charging member 32, a roller-type member to be brought into contact with the photoconductor 30 may alternatively be employed as the charging member 32.

An optical scanning device 60 is arranged above the four image forming means 10. The optical scanning device 60 includes an M-Y unit 60-1, which performs scanning exposure of the photoconductors 30a and 30b, and a Bk-C unit 60-2, which performs scanning exposure of the photoconductors 30c and 30d. The optical scanning device 60 irradiates each of the surfaces of the photoconductors 30 with scanning light, while performing on/off control of the scanning light in accordance with image data, thereby forming a corresponding electrostatic latent image on the surface. As the photoconductor 30 rotates, the electrostatic latent image formed on the photoconductor 30 by the optical scanning device 60 passes through the developing device 33, where toner of a corresponding color is applied to the electrostatic latent image. The electrostatic latent image is thus developed into a visible image.

An endless-belt-type intermediate transfer belt 40, which is configured as an intermediate transfer member, is arranged facing the photoconductors 30 of the respective image forming means 10. Each of the photoconductors 30 is in contact with the outer surface of the intermediate transfer belt 40. The intermediate transfer belt 40 is wound and supported on a plurality of support rollers 40a, 40b, and 40c. The support roller 40c is coupled to a drive motor, which is a drive source. Driving the drive motor causes the intermediate transfer belt 40 to revolve anticlockwise in FIG. 1 (the direction indicated by arrows in FIG. 1) and, simultaneously, the support rollers 40a and 40b, which are rotatable, are rotated by the revolving motion of the intermediate transfer belt 40. Primary transfer rollers (not shown) are arranged on the inner surface of the intermediate transfer belt 40 in a fashion to face the photoconductors 30 with the belt therebetween. A primary transfer bias is applied from a high-voltage power supply (not shown) to the primary transfer roller to perform primary transfer of transferring the toner image developed by the developing device 33 onto the intermediate transfer belt 40. A cleaning blade included in the cleaning device 31 removes primary-transfer residual toner, which is toner left on the photoconductor 30 without being transferred in the primary transfer, so that the photoconductor 30 can perform image forming operations for a next job.

The image forming apparatus 1 includes a secondary transfer charger 48, which is a secondary transfer unit, at a position where the secondary transfer charger 48 faces the support roller 40c with the intermediate transfer belt 40 therebetween. The secondary transfer charger 48 is placed away from the intermediate transfer belt 40 by a predetermined distance. A voltage having a polarity opposite to that of the charging member 32 is applied to the secondary transfer charger 48.

The image forming apparatus 1 includes a pair of registration rollers 56 in addition to a paper feeding roller 54 and a paper feeding cassette 59 to be loaded with recording media. A fixing device 50 is arranged downstream from the secondary transfer charger 48 in the conveying direction of a recording medium. The fixing device 50 includes a pair of rollers, which are a pressing roller and a heating roller, to apply heat and a pressure to the recording medium to fix a toner image onto a recording medium. A pair of conveyance rollers 52, a pair of paper ejection rollers 58, and the like for ejecting a recording medium exiting from the fixing device 50 onto a recording-medium output portion, which may be a paper ejection tray 5 for example, are arranged downstream of the fixing device 50 in the conveying direction.

Image forming operations performed by the image forming apparatus are described below. Structures involved in the image forming operations of forming a toner image on each of the photoconductors 30 and transferring the toner image onto the intermediate transfer belt 40 are all substantially identical among the photoconductors 30 except for the color of the toner image. Therefore, the reference letter a, b, c, or d appended to identify each color is omitted as appropriate.

Upon receiving an image forming signal from a personal computer or the like, the drive source starts rotating the photoconductor 30 clockwise. At this time, a neutralizing device irradiates the surface of the photoconductor 30 with light, thereby initializing surface potential. The surface of the photoconductor 30, whose surface potential is initialized, is uniformly charged to a predetermined polarity by the charging member 32. The charged surface of the photoconductor 30 is irradiated with laser light emitted from the optical scanning device 60. As a result, a desired electrostatic latent image is formed on the surface of the photoconductor 30. The image data, in accordance with which the optical scanning device 60 performs exposure through optical scanning, is single-color image data obtained by separating a desired full-color image into image data of each of the toner colors, which are yellow, cyan, magenta, and black. The developing device 33 applies toner (developing agent) of a corresponding color onto the electrostatic latent image formed on the photoconductor 30 as described above when the electrostatic latent image passes through the developing device 33, thereby developing the electrostatic latent image into a visible, toner image.

The intermediate transfer belt 40 is driven to revolve counterclockwise in FIG. 1. The primary transfer voltage having the polarity opposite to the polarity of the charge of the toner image formed on the photoconductor 30 is applied to the primary transfer rollers. The primary transfer voltage induces a primary-transfer electric field between the photoconductor 30 and the intermediate transfer belt 40. Hence, the primary transfer of electrostatically transferring the toner image on the photoconductor 30 onto the intermediate transfer belt 40, which is driven to revolve in synchronization with the photoconductor 30, is performed. The toner images of the respective colors undergone the primary transfer in this manner are superimposed, one by one from upstream to downstream in the conveying direction of the intermediate transfer belt 40, on the intermediate transfer belt 40 each at appropriate timing to form a desired full-color image on the intermediate transfer belt 40.

Meanwhile, a bundle of sheets of a recording medium, on each of which an image is to be formed, placed on the paper feeding cassette 59 is separated one sheet by one sheet by an appropriate conveying member(s), such as the paper feeding roller 54, as appropriate, and separated sheets are sequentially conveyed to the pair of registration rollers 56. The thus-separated one sheet of the recording medium is conveyed to a nip area between the pair of registration rollers 56, which has not started rotating yet. A leading end of the conveyed recording medium contacts the nip area between the pair of registration rollers 56 and forms what may generally be referred to as "registration loop". As a result, registration of the recording medium is performed.

Thereafter, driving to rotate the pair of registration rollers 56 is started with timing adjusted for the full-color image (i.e., the superimposed toner images) borne on the intermediate transfer belt 40. The recording medium is delivered to a secondary transfer portion formed with the support roller 40c and the secondary transfer charger 48, which faces the support roller 40c with the intermediate transfer belt 40 therebetween and is apart from the support roller 40c by the predetermined gap. A predetermined transfer voltage is applied to the secondary transfer charger 48 to collectively transfer the full-color image (i.e., the superimposed toner images) formed on the surface of the intermediate transfer belt 40 onto the recording medium.

The recording medium, onto which the toner image is transferred, is conveyed to the fixing device 50. Heat and a pressure are applied to the toner image when the recording medium passes through the fixing device 50 to fix the toner image as a semi-permanent full-color image onto the recording medium. The recording medium, onto which the image is fixed by the fixing device 50, is ejected onto the recording-medium output portion, which may be the paper ejection tray 5, for example, via the pair of conveyance rollers 52, the pair of paper ejection rollers 58, and the like. Intermediate-transfer-belt cleaning means removes and collects residual toner left on the intermediate transfer belt 40 without being transferred at the secondary transfer portion where the secondary transfer charger 48 is arranged.

A configuration of the optical scanning device 60 is described below. The optical scanning device 60 includes the M-Y unit 60-1, which performs scanning exposure of the photoconductors 30a and 30b, and the Bk-C unit 60-2, which performs scanning exposure of the photoconductors 30c and 30d. Because the M-Y unit 60-1 and the Bk-C unit 60-2 are identical in optical layout, the Bk-C unit 60-2 is described below, and description about the M-Y unit 60-1 is omitted.

Figure 2:
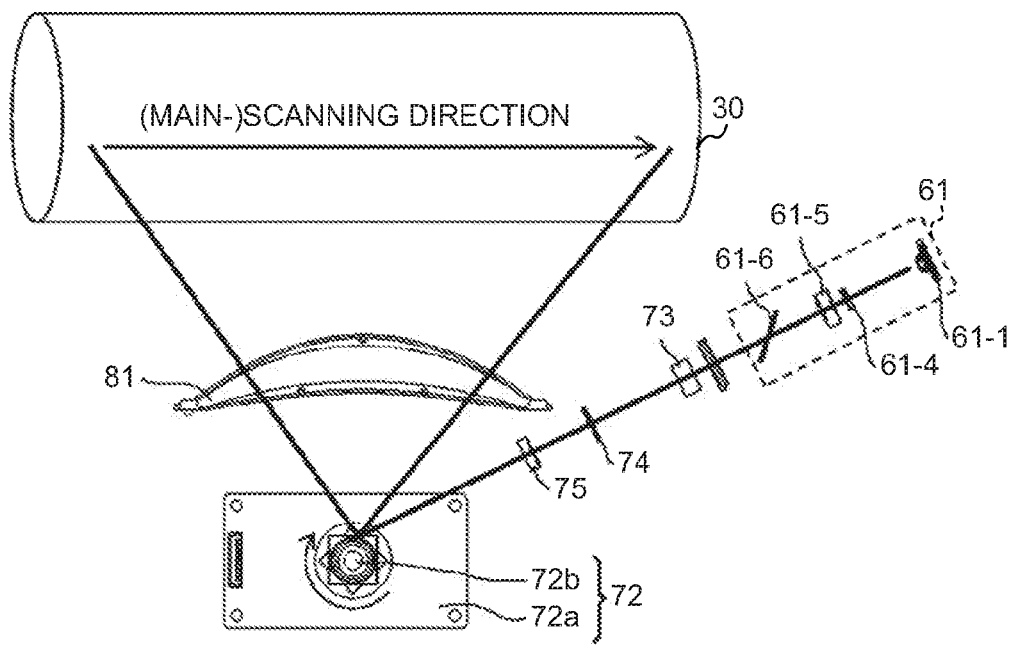
FIG. 2 is a configuration diagram schematically illustrating an input optical system of the image forming apparatus illustrated in FIG. 1.

FIG. 2 is a configuration diagram schematically illustrating an input optical system of the Bk-C unit 60-2. A light source unit 61, which emits laser light, includes a light source 61-1, which emits laser light as linearly polarized light, a quarter wave plate 61-4, which converts the laser light into circularly polarized light, a collimator lens 61-5, which collimates the laser light whose polarization is converted by the quarter wave plate into parallel light, and an aperture 61-6, which cuts off a part of the collimated laser light. The light source 61-1 may be an LD (laser diode), an LDA (laser diode array), or a VCSEL (vertical-cavity surface-emitting laser), for example, and has a plurality of light-emitting points. These optical elements are assembled onto a light-source holder in one piece therewith. The laser light emitted from the light source unit 61 impinges on a deflector 72, which is an optical deflector, via the input optical system. The light-emitting points are not limited to those of the present embodiment; any light source including one or more light-emitting points can be used as the light source 61-1.

The input optical system, which defines a beam profile, includes a prism beam splitter (PBS) 73, which splits the laser light emitted from the light source unit 61 into two beams of different polarization in a cross-sectional plane extending in the sub-scanning direction, a quarter wave plate 74, which converts the light split into the two beams of different polarization from linearly polarized light to circularly polarized light, and a cylindrical lens (CYL) 75. The CYL 75 has a power only in the cross-sectional plane extending in the sub-scanning direction and causes the laser light converted into circularly polarized light to form images on mirror facets of a rotating polygon mirror 72b mounted on the deflector 72.

The laser light, of which profile is defined by the input optical system, forms images on the mirror facets of the rotating polygon mirror 72b of the deflector 72. The deflector 72 stably drives the rotating polygon mirror 72b at a desired rotation speed. The laser light is caused to impinge on the mirror facets of the rotating polygon mirror 72b in this manner to thus be scanned in the main-scanning direction.

Figure 3:
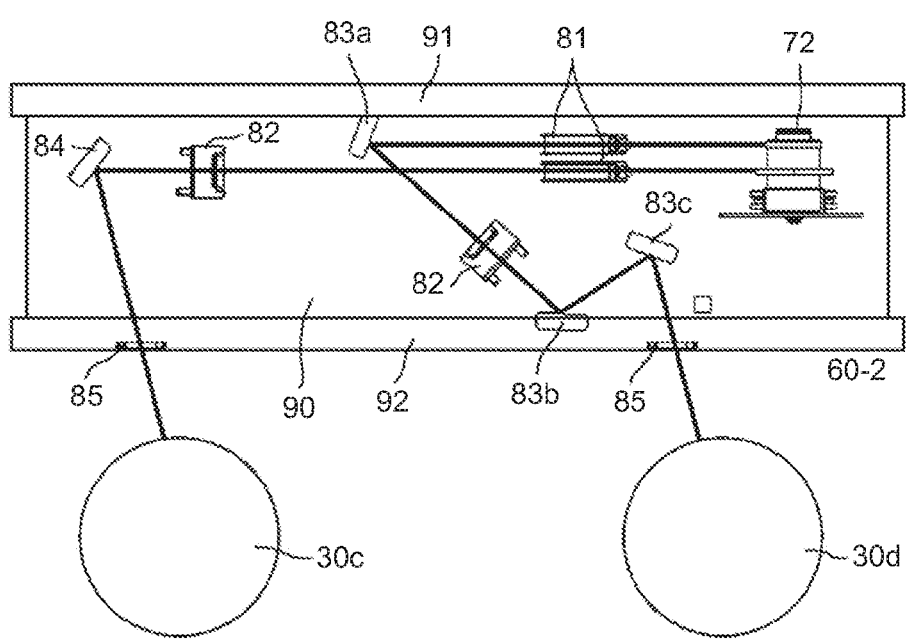
FIG. 3 is a configuration diagram schematically illustrating a scanning optical system of the image forming apparatus illustrated in FIG. 1.

FIG. 3 is a configuration diagram schematically illustrating a scanning optical system. Laser light incident on an upper tier 72-2 of the rotating polygon mirror 72b scans the surface of the photoconductor drum 30 (30d, 30c) at a constant velocity after passing through a first exit lens (L1) 81, a second exit lens (L2) 82, and a dustproof glass 85, thereby forming an electrostatic latent image on the surface. Mirrors 83a, 83b, and 83c for redirecting the laser light are arranged on the optical path.

Laser light incident on a lower tier 72-1 of the rotating polygon mirror 72b scans the surface of the photoconductor drum 30 (30d, 30c) at a constant velocity after passing through the first exit lens 81, the second exit lens 82, and the dustproof glass 85, thereby forming an electrostatic latent image on the surface. A mirror 84 for redirecting the laser light is arranged on the optical path. The scanning optical system, the input optical system, and the deflector described above are fixed to an optical housing 90, which is a housing, in one piece therewith to ensure characteristics of the optical scanning device 60.

Figure 4:
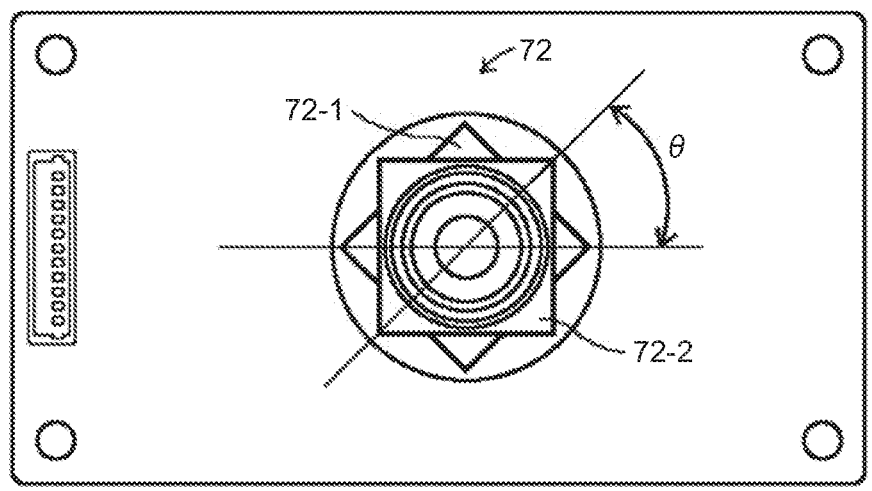
FIG. 4 is a configuration diagram schematically illustrating a deflector of the image forming apparatus illustrated in FIG. 1.

As illustrated in FIG. 4, the deflector 72 includes the rotating polygon mirror 72b mounted thereon and is assembled onto a motor board 72a. The polygon mirror 72b is a stack of two tiers, each having four mirror facets. The upper tier 72-2 and the lower tier 72-1 of the rotating polygon mirror 72b are rotationally displaced from each other by an angle θ. Although the angle θ is set to 45 degrees in the present embodiment, the value of θ is not limited thereto. The upper tier 72-2 of the rotating polygon mirror 72b scans the photoconductor drum 30d, while the lower tier 72-1 of the rotating polygon mirror 72b scans the photoconductor drum 30c. This structure allows performing scanning exposure in accordance with respective image data for each of the stations rather than performing scanning geometrically simultaneously.

Figure 5:
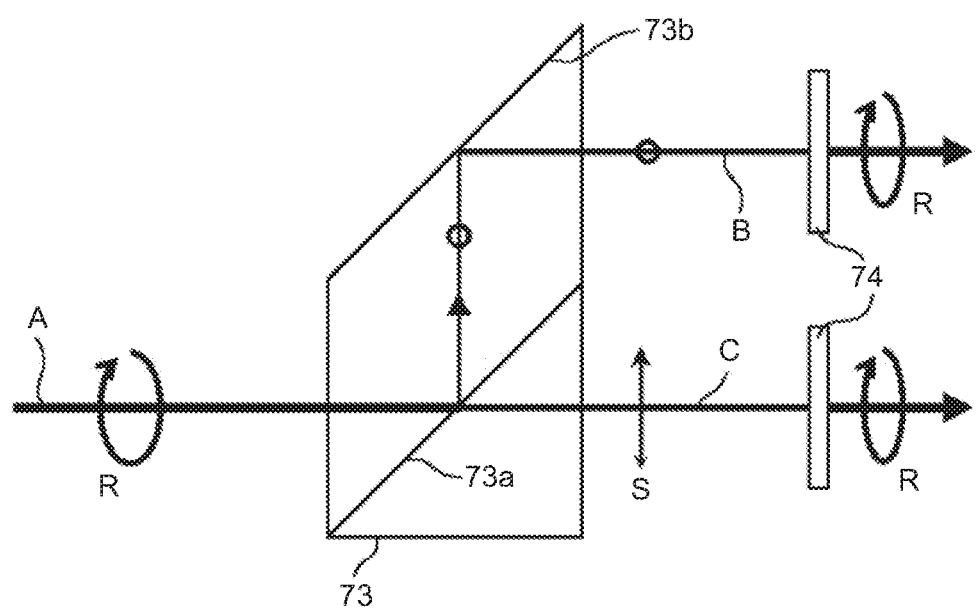
FIG. 5 is an explanatory diagram illustrating a prism beam splitter of the image forming apparatus illustrated in FIG. 1.

FIG. 5 is an explanatory diagram illustrating the prism beam splitter 73, which splits laser light in two. Laser light (a laser beam A) emitted from the light source unit 61 undergoes conversion from linearly polarized light into circularly polarized light performed by the quarter wave plate 61-4 in the light source unit 61. When the laser light (the light beam A) having the property of circularly polarized light reaches a polarization splitting surface 73a of the prism beam splitter 73, only an S-polarization component, which is a component perpendicular to the mirror facet (reflection surface) of the rotating polygon mirror 72b, of circularly-polarized light components transmits through the polarization splitting surface 73a.

On the other hand, when the laser light (the light beam A) having the property of circularly polarized light reaches the polarization splitting surface 73a of the prism beam splitter 73, a P-polarization component, which is a component parallel to the mirror facet (reflection surface) of the rotating polygon mirror 72b, of the circularly-polarized light components is reflected off the polarization splitting surface 73a. The laser light reflected off the polarization splitting surface 73a is further reflected off a reflection mirror facet 73b of the prism beam splitter 73. A single laser beam is split into two laser beams of different polarization in this manner (hereinafter, "beam splitting"). Each of the laser beams obtained by the beam splitting through the prism beam splitter 73 and exiting therefrom is converted back to circularly polarized light by the quarter wave plate 74.

Figure 6:
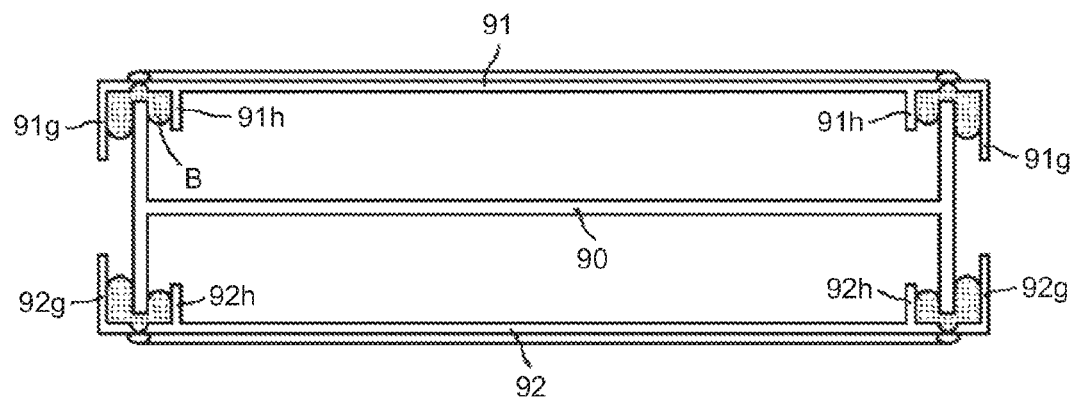
FIG. 6 is an explanatory diagram illustrating a sealing configuration of the image forming apparatus illustrated in FIG. 1.

A sealing configuration, which is a feature of the present invention, of the optical scanning device 60 is described in detail below. FIG. 6 is an explanatory diagram illustrating the sealing configuration of the optical scanning device 60. Cover members 91 and 92 are assembled onto openings of the optical housing 90, in which optical elements are housed. Reliable sealing is achieved by placing a viscoelastic member B, which is a sealing member, made of resin, synthetic rubber, or the like in each of gaps made between the cover member 91, 92, and opening ends of the optical housing 90. The number of the cover members is not limited to that of the present embodiment and can be any number equal to or larger than one.

The cover members 91 and 92 are adherends, to which the viscoelastic members B adhere. The cover member 91, 92 has a box shape whose one face is open to provide an opening and includes an outer wall 91g, 92g upwardly extending from an outer periphery of a bottom of the cover member 91, 92. The cover member 91, 92 further includes an inner wall 91h, 92h inside the outer wall 91g, 92g.

The cover member 91, 92 is positioned with respect to the optical housing 90 and fixed thereto by a positioning portion and a screw fastening portion. The optical housing 90 and the cover member 91, 92 are configured such that a bearing surface of the screwing portion provides a clearance. Accordingly, the cover members 91 and 92 are attached to the optical housing 90 such that side wall portions of the optical housing 90 are interposed between the outer wall 91g, 92g and the inner wall 91h, 92h.

Each of the viscoelastic members B is heated by a melter or the like and poured into a portion surrounded by the outer wall 91g, 92g, the inner wall 91h, 92h, and an adherend surface 91e, 92e, which is a portion of the bottom sandwiched between the outer wall 91g, 92g and the inner wall 91h, 92h, of the cover members 91 and 92. The viscoelastic members B are then hardened by being cooled. The viscoelastic members B are adhered onto the cover members 91 and 92 in this manner. Adherend portions of the viscoelastic members B are the outer walls 91g and 92g, the inner walls 91h and 92h, and the adherend surfaces 91e and 92e. More specifically, the adherend portions of the viscoelastic members B are the portions surrounded by the outer wall 91g, 92g, the inner wall 91h, 92h, and the adherend surface 91e, 92e.

Meanwhile, because the cover member 91, 92 is assembled onto the optical housing 90 with the viscoelastic members B, which are filled onto the adherend surface 91e, 92e, therebetween, an opposing force is applied to the optical housing 90 from the respective viscoelastic members B.

Figure 7:
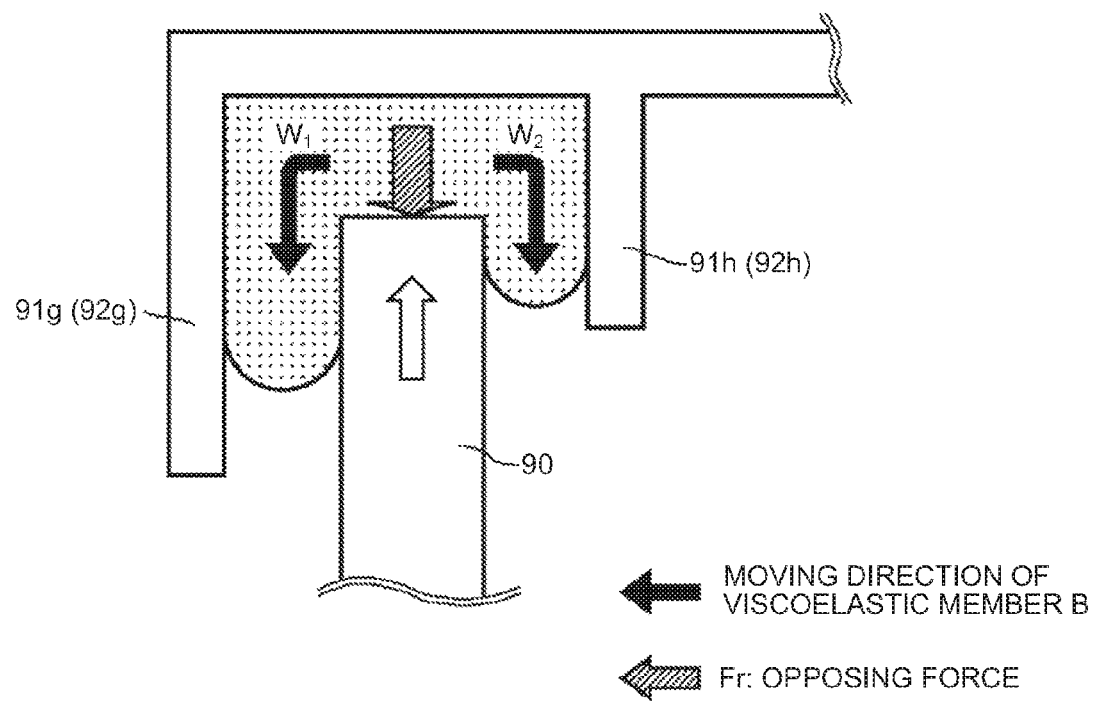
FIG. 7 is an explanatory diagram illustrating a sealing configuration of a conventional housing structure.

More specifically, in a state where the cover member 91, 92 is assembled onto the optical housing 90, a distal end (i.e., the opening end) of the side wall portion of the optical housing 90 compresses the viscoelastic member B as illustrated in FIG. 7. At this time, an opposing force Fr is applied from the viscoelastic member B and the cover member 91, 92 to the optical housing 90.

When compressed by the optical housing 90, the viscoelastic member B moves in a direction $W_1$, in which the viscoelastic member B advances to between the outer wall 91g, 92g and an outer wall portion of the optical housing 90, and a direction $W_2$, in which the viscoelastic member B advances to between the inner wall 91h, 92h and the inner wall portion of the optical housing 90. Because a shear force is applied to the optical housing 90 by the movement of the viscoelastic member B, an opposing force, which depends on an amount of compression of the viscoelastic member B, is applied to the optical housing 90.

The opposing force acting on the optical housing 90 is uneven, varying depending on a position where the opposing force is applied. This variation is due to a difference between a gap between the opening end of the optical housing 90 and the cover member 91 and a gap between the opening end and the cover member 92, variation in filling height of the viscoelastic member B, and the like. The opposing force unevenly applied to the optical housing 90 irregularly deforms the optical housing 90, thereby degrading optical characteristics.

Figure 8:
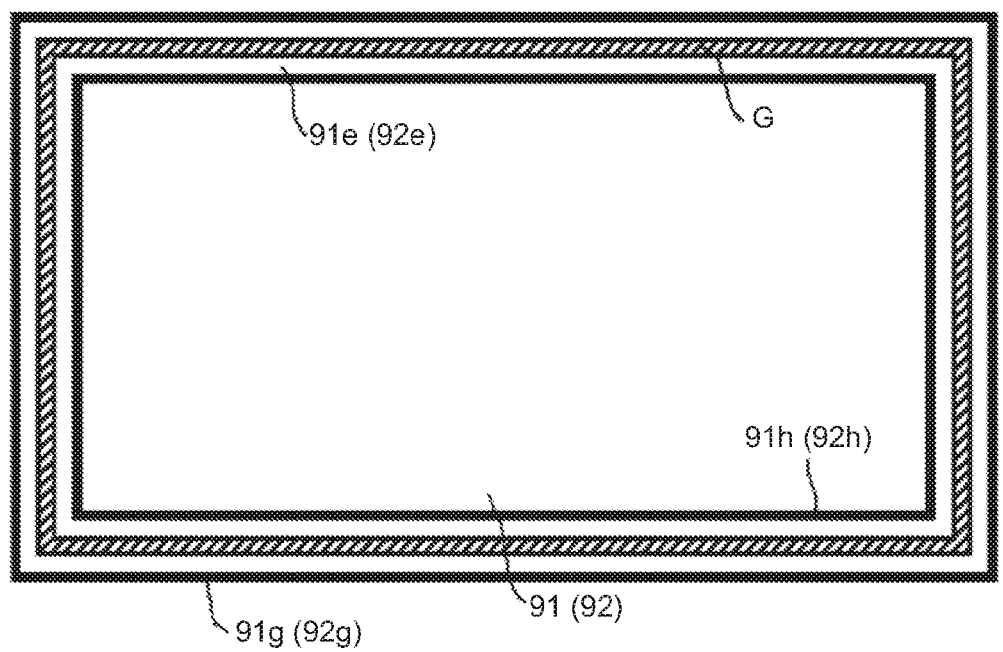
FIG. 8 is an explanatory diagram illustrating a cover member of the image forming apparatus illustrated in FIG. 1.
Figure 9:
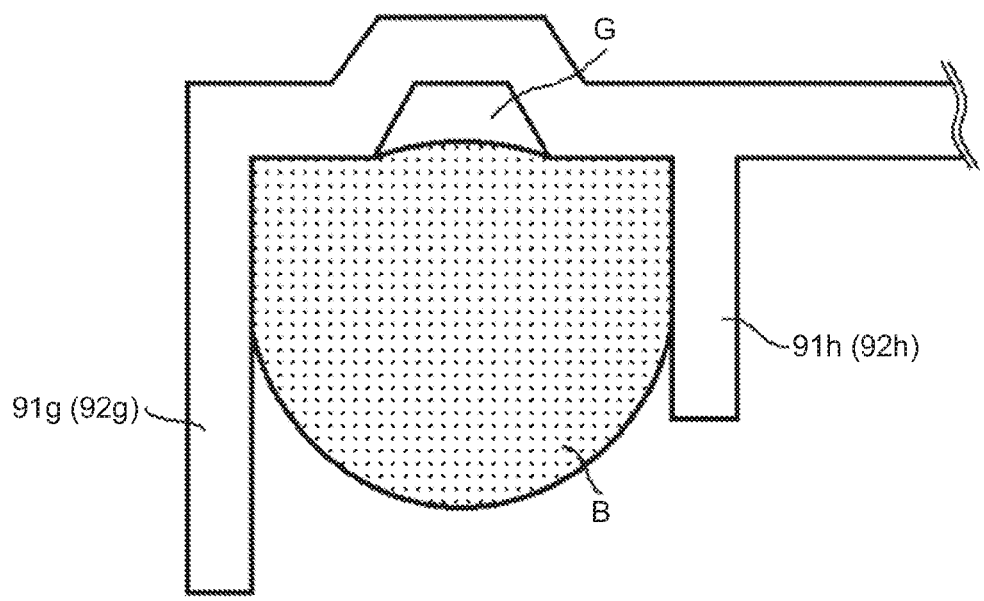
FIG. 9 is an explanatory diagram illustrating the sealing configuration of a housing structure of the image forming apparatus illustrated in FIG. 1.
Figure 11:
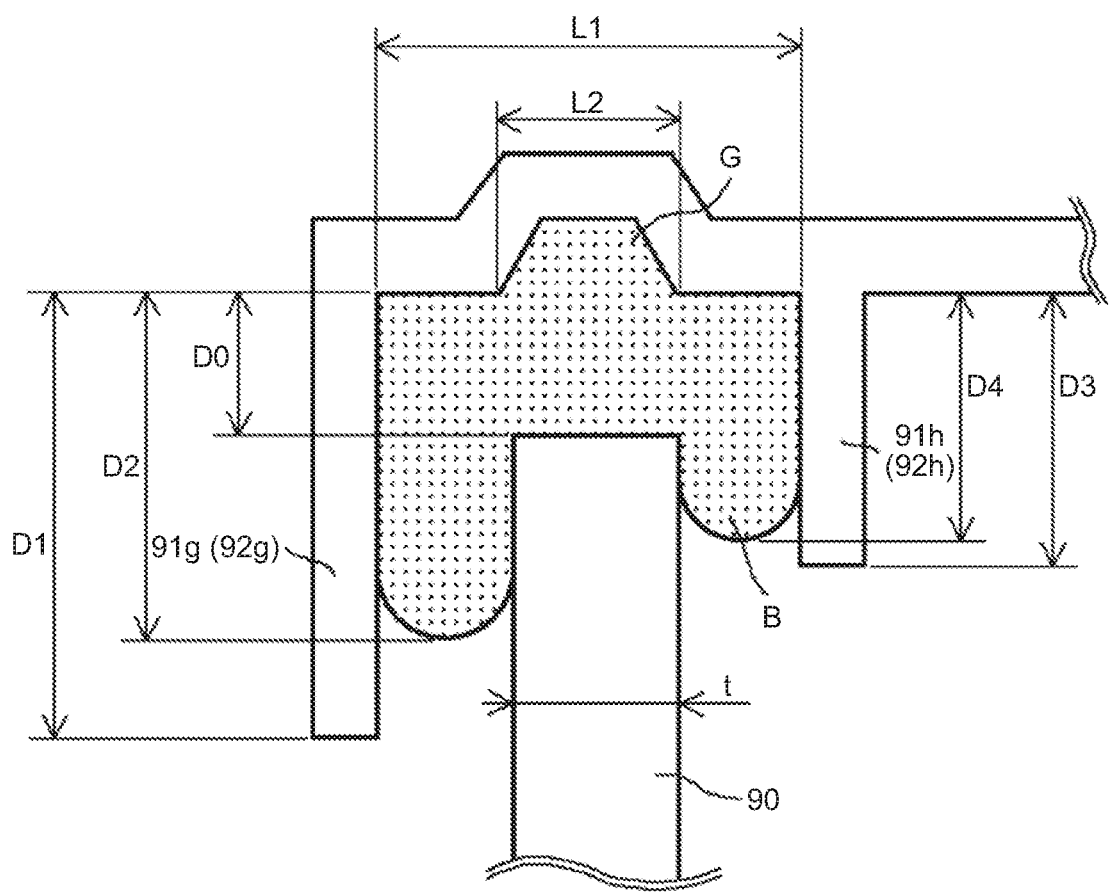
FIG. 11 is an explanatory diagram illustrating the sealing configuration of the housing structure of the image forming apparatus illustrated in FIG. 1.

However, in the present embodiment, as illustrated in FIGS. 8 and 9, a channel-like groove G is formed in and to extend continuously all around the adherend surface 91e, 92e of the cover member 91, 92 while facing the opening end of the optical housing 90. A distance L1 between the outer wall 91g, 92g and the inner wall 91h, 92h of the cover member 91, 92 is set to be larger than an opening width L2 of the groove G in the adherend surface 91e, 92e as illustrated in FIG. 11. This dimensional setting prevents the groove G from being filled with the viscoelastic member B when the viscoelastic member B is ejected onto the adherend surface 91e, 92e using a melter or the like.

The structure of the groove G is not limited to that of the embodiment, in which the groove G is formed in and to extend continuously all around the adherend surface 91e, 92e while facing the opening end. For example, the groove G may be formed in and to extend intermittently all around the adherend surface 91e, 92e while facing the opening end. Further alternatively, the groove G may be formed in at least a portion of the adherend surface 91e, 92e. The structure of the groove G is not limited to that of the embodiment, in which the single groove G is formed in and to extend continuously all around the adherend surface 91e, 92e while facing the opening end. For example, a plurality of the grooves G may be adjacently formed. The groove G is not necessarily formed in the adherend surface 91e, 92e. For example, the groove G may be formed in the outer wall 91g, 92g or the inner wall 91h, 92h.

Because the viscoelastic member B ejected onto the adherend surface 91e, 92e by a melter or the like, the viscoelastic member B is hardened by being cooled without filling the groove G as illustrated in FIG. 9.

Figure 10:
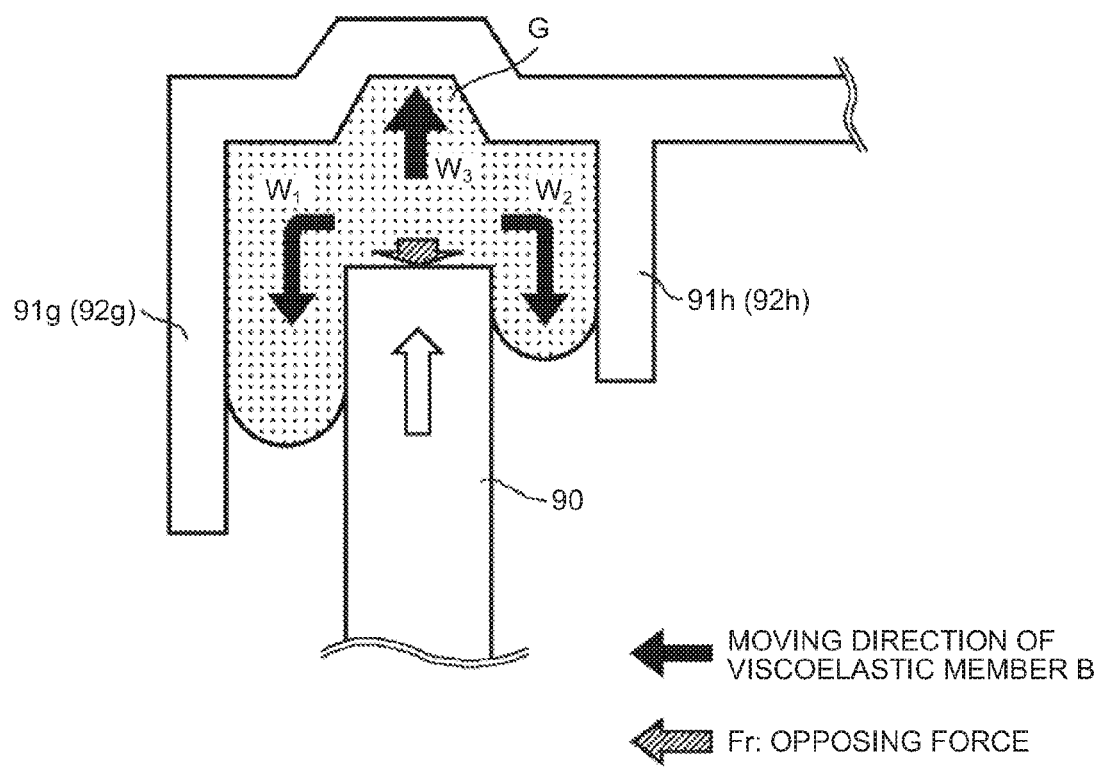
FIG. 10 is an explanatory diagram illustrating the sealing configuration of the housing structure of the image forming apparatus illustrated in FIG. 1.

When compressed by the optical housing 90, the viscoelastic member B moves in a direction $W_3$, which is the direction toward the groove G formed in the cover member 91, 92, as illustrated in FIG. 10. As a result, an amount of compression of the viscoelastic member B can be reduced. Accordingly, when the cover member 91, 92 is assembled onto the optical housing 90, the opposing force applied to the optical housing 90 can be reduced and, simultaneously, the optical housing 90 can be reliably sealed. Because variation in the filling height of the viscoelastic member B is dampened by the groove G, the opposing force applied to the optical housing 90 will not become uneven. Hence, degradation in optical characteristics can be reduced.

A height D1 of the outer wall 91g, 92g may preferably be larger than a height D2 of the viscoelastic member B formed between the outer wall 91g, 92g and the optical housing 90 as illustrated in FIG. 11. A height D3 of the inner wall 91h, 92h may preferably be larger than a height D4 of the viscoelastic member B formed between the inner wall 91h, 92h and the optical housing 90. When structured as such, because interference between the cover member 91, 92 and the optical housing 90 will not occur, the amount of deformation of the optical housing 90 and the cover members 91 and 92 can be reduced. Meanwhile, in the state where the cover member 91, 92 is assembled onto the optical housing 90, the opening end of the optical housing 90 is separated from the adherend surface 91e, 92e by a distance (gap) D0, where D0>0.

The distance L1 between the outer wall 91g, 92g and the inner wall 91h, 92h of the cover member 91, 92 is desirably larger than a thickness t of the outer wall portion of the optical housing to achieve reliable sealing.

Meanwhile, in an image forming apparatus using a deflector, the deflector and a light source (which may be an LD (laser diode), an LDA (laser diode array), or a VCSEL (vertical-cavity surface-emitting laser), for example) are often replaced due to expiration of usable life, degradation, or the like. It is necessary to remove a member, which corresponds to the cover member 91, 92 in the present embodiment, to replace the deflector and/or the light source. At removal of the cover member 91, 92, a situation that the viscoelastic member B sticks to the optical housing 90 and is detached from the cover member 91, 92, which is the adherend, can occur. In this case, because it is difficult to adhere the viscoelastic member B detached from the cover member 91, 92 to the cover member 91, 92 again, the need of replacing the whole image forming unit arises, which is unpreferable from a perspective of cost borne by a user.

However, in the present embodiment, because the viscoelastic member B is entrapped in the groove G, detachment of the viscoelastic member B from the cover member 91, 92, which is the adherend, can be reduced. Accordingly, it is possible to use the cover member 91, 92 removed from the optical housing 90 with the viscoelastic member B sticking thereto again.

Although embodiments of the present invention have been described above, embodiments of the invention are not limited thereto. For example, the present invention is applicable to a configuration, in which a cover member does not include an inner wall. It should be noted that the materials and dimensions of the components described in the embodiments are only exemplary and other various materials and dimensions can be selected so long as the advantages of the present invention are achievable.

According to an aspect of the present invention, a simple housing structure capable of reliably sealing a housing can be provided.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A housing structure comprising:
    a housing configured to house therein components for use by an image forming apparatus and having an opening;
    a cover member configured to cover the opening of the housing and including an adherend portion;
    a sealing member placed between an opening end of the housing and the cover member and configured to seal between the cover member and the housing by being compressed when the cover member is attached to the housing,
    the sealing member adhering to the adherend portion of the cover member, and
    at least one groove being formed on the cover member;
    wherein the cover member has a shape with an open face, and includes a bottom, an outer wall upwardly extending from an outer periphery of the bottom, and an inner wall arranged inside the outer wall,
    wherein a side wall of the housing is interposed between the outer wall and the inner wall of the cover member, and compressed against the sealing member,
    wherein the at least one groove is formed on the bottom, the outer wall, or the inner wall of the cover member.

2. The housing structure according to claim 1,
    wherein the at least one groove is formed on the bottom of the cover member between the outer wall and the inner wall;
    wherein a distance between the outer wall and the inner wall of the cover member is set to be larger than an opening width of the at least one groove.

3. The housing structure according to claim 1, wherein the at least one groove is formed in the bottom between the outer wall and the inner wall.

4. The housing structure according to claim 1, wherein a height, with reference to the bottom, of the sealing member formed between the outer wall and the housing is smaller than a gap between the opening end and the bottom.

5. The housing structure according to claim 1, wherein a height, with reference to the bottom, of the sealing member formed between the inner wall and the housing is smaller than a gap between the opening end and the bottom.

6. The housing structure according to claim 1, wherein the sealing member is a viscoelastic member.

7. The housing structure according to claim 1, wherein the groove is formed to extend continuously while facing the opening end.

8. The housing structure according to claim 1, wherein the number of the cover members is at least one.

9. An optical scanning device comprising:
   a light source configured to emit a light beam;
   a deflector configured to deflect the light beam emitted from the light source, thereby causing the light beam to scan in the main-scanning direction; and
   a housing configured to house therein a plurality of optical elements for causing the light beam deflected by the deflector to impinge on a to-be-scanned surface,
   the housing having the housing structure according to claim 1.

10. The optical scanning device according to claim 9, wherein the light source includes at least one light-emitting point.

11. The optical scanning device according to claim 9, wherein the light source is a surface-emitting laser.

12. An image forming apparatus comprising the housing structure according to claim 1 and the optical scanning device according to claim 9.

13. The image forming apparatus according to claim 12, wherein the image forming apparatus is configured to form a raster image.

* * * * *